(12) United States Patent
Wells et al.

(10) Patent No.: US 7,905,718 B2
(45) Date of Patent: Mar. 15, 2011

(54) SHEETING HEAD

(75) Inventors: Dale K. Wells, Dayton, OH (US); Ankush Mittal, Sidney, OH (US)

(73) Assignee: Illinois Tool Works Inc., Glenview, IL (US)

( * ) Notice: Subject to any disclaimer, the term of this patent is extended or adjusted under 35 U.S.C. 154(b) by 808 days.

(21) Appl. No.: 11/867,206

(22) Filed: Oct. 4, 2007

(65) Prior Publication Data
US 2009/0090253 A1 Apr. 9, 2009

(51) Int. Cl.
*A21C 3/02* (2006.01)
(52) U.S. Cl. .......................... 425/135; 425/335; 425/367
(58) Field of Classification Search ................... 425/135, 425/141, 145, 335, 363, 367, 471
See application file for complete search history.

(56) References Cited

U.S. PATENT DOCUMENTS

| | | | |
|---|---|---|---|
| 2,116,930 A | 5/1938 | Kirchhoff | |
| 2,715,879 A * | 8/1955 | Sawyer | 425/337 |
| 2,746,401 A | 5/1956 | Archer | |
| 3,476,058 A | 11/1969 | Watkin et al. | |
| 4,057,377 A * | 11/1977 | Sakurazawa | 425/135 |
| 4,734,293 A | 3/1988 | Pivonka | |
| 4,880,371 A * | 11/1989 | Spinelli et al. | 425/135 |
| 4,966,541 A | 10/1990 | Mistretta | |
| 5,154,941 A * | 10/1992 | Hayashi | 425/135 |
| 5,180,593 A | 1/1993 | Mistretta et al. | |
| 5,558,885 A | 9/1996 | Herrera | |
| 5,576,033 A | 11/1996 | Herrera | |
| 5,580,583 A * | 12/1996 | Caridis et al. | 425/363 |
| 5,674,543 A | 10/1997 | Partida | |
| 5,811,137 A | 9/1998 | Clark et al. | |
| 6,024,554 A * | 2/2000 | Lawrence | 425/363 |
| 6,530,771 B1 | 3/2003 | Clark | |
| 6,610,239 B2 * | 8/2003 | McLaren | 264/338 |
| 7,156,644 B2 | 1/2007 | Herrera | |
| 7,425,125 B2 * | 9/2008 | Kurachi et al. | 425/471 |
| 2002/0018825 A1 * | 2/2002 | Starkey | 425/444 |

FOREIGN PATENT DOCUMENTS

EP 0182563 A2 5/1986

(Continued)

OTHER PUBLICATIONS

Invitation to Pay Adddtional Fees and Partial International Search for International application No. PCT/US2008/078552 dated Mar. 23, 2009.

(Continued)

*Primary Examiner* — James Mackey
(74) *Attorney, Agent, or Firm* — Dinsmore & Shohl LLP

(57) ABSTRACT

Sheeting head apparatus for rolling and flattening a quantity of dough, includes a sheeting head, an infeed conveyor, and an outfeed conveyor. The sheeting head defines a dough path therethrough and includes a plurality of opposed roller pairs. The first roller of each roller pair is mounted for rotation and for independent movement toward and away from the dough path. The infeed conveyor conveys a quantity of dough to the sheeting head, and the outfeed conveyor for conveying a quantity of rolled and flattened dough from the sheeting head. A sensor, adjacent the infeed conveyor, senses an unduly thick or double quantity of dough being conveyed by the infeed conveyor to the sheeting head. A control is responsive to the sensor and causes the sheeting head to move the first roller of each roller pair away from the dough path.

11 Claims, 7 Drawing Sheets

FOREIGN PATENT DOCUMENTS

| | | | |
|---|---|---|---|
| EP | 0270497 | A2 | 6/1988 |
| GB | 2164600 | A | 3/1986 |
| NL | 9402026 | A | 7/1996 |
| WO | 9528087 | A1 | 10/1995 |
| WO | 2005027645 | A1 | 3/2005 |

OTHER PUBLICATIONS

International Search Report and Written Opinion for International application No. PCT/US2008/078552 dated Jun. 25, 2009.

* cited by examiner

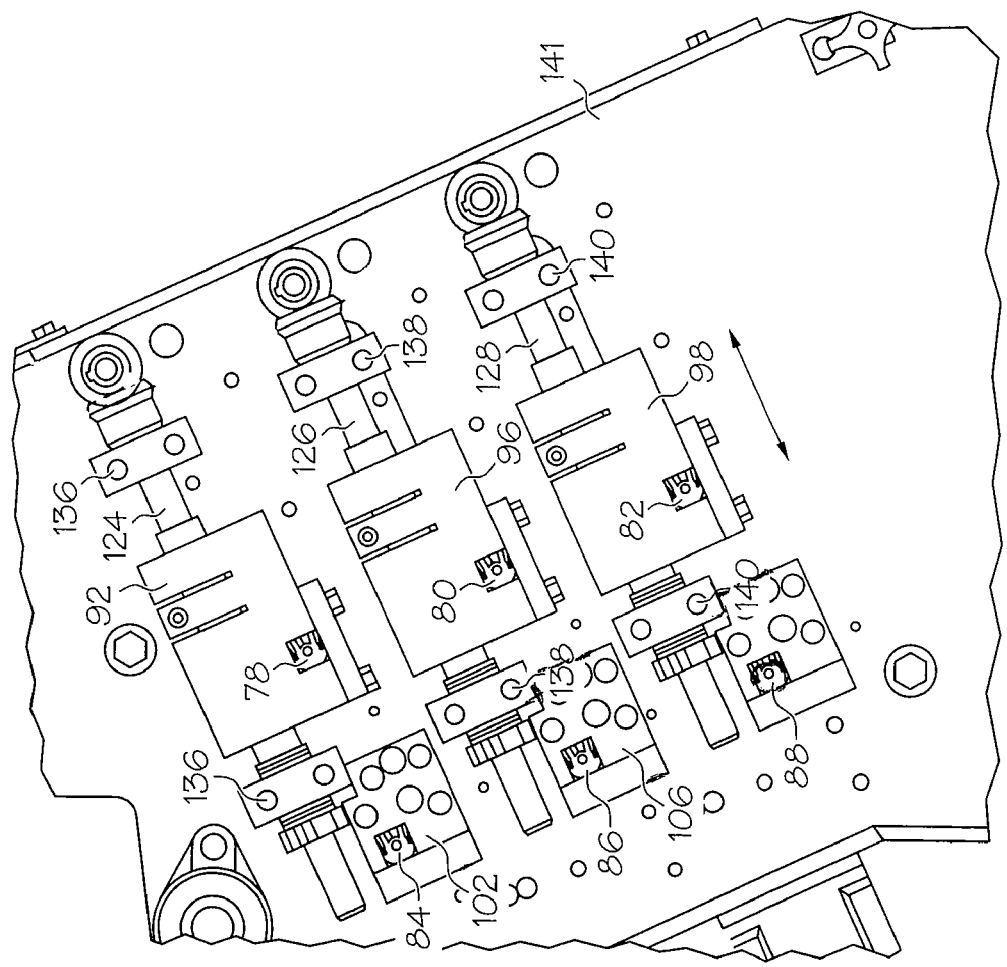

SHEETING HEAD

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates generally to a sheeting head, and more particularly to a sheeting head apparatus of the type that is used to roll and flatten quantities of dough, such as bread dough, before it is baked or otherwise processed prior to baking. The sheeting operation generally equally distributes air cells trapped in the dough, and impacts the appearance and consistency of the final baked product.

Dough sheeting devices have long been used to roll and flatten dough in commercial bakeries before the dough is baked into various products. U.S. Pat. No. 2,746,401, issued May 22, 1956, to Archer, for example, shows one such dough rolling and sheeting device, which is used for rolling bread dough after the dough has been divided into dough pieces of appropriate size for baking into bread loaves. This is a process called molding in which the dough is formed into the shape of the finished process, after it has been proofed and divided into the appropriate size portions. In the device shown in the Archer patent, the dough is sheeted, curled, rolled and then sealed. The molder receives the dough piece as a flattened spheroid. It is flattened further by passing through a series of counter rotating roller pairs into a thick sheet and then into a loose cylinder shape with appropriate rolls or belts. The dough piece is then sealed to allow it to expand without separating into layers.

The Archer patent recognizes the propensity of the bread dough to stick to rollers as it is being processed. To avoid this, Archer takes the conventional approach of providing rollers that are covered with relatively thick, somewhat soft, sleeves of tetrafluorethylene material, such as Teflon®. It is typical to use rollers that have a 0.5 inch thick sleeve of Teflon. While Teflon prevents the dough from sticking and jamming the sheeting head, it is not as durable as desired. Once the roller sleeve is damaged, as by feeding through dough pieces of too great a thickness or by feeding through two dough pieces at once, stacked one on the other, referred to as a double, the non-stick properties of the roller decline very rapidly. Additionally, prior art rollers with Teflon sleeves wear rapidly, requiring relatively frequent, time consuming and expensive roller replacement.

It is seen, therefore, that there is a need for an improved sheeting head which is capable of dealing with doubles without jamming, and for such a sheeting head in which the surfaces of the rollers are less likely to be damaged and are capable of operating for extended periods without the necessity of replacement.

SUMMARY OF THE INVENTION

These needs are met by a sheeting head apparatus for rolling and flattening a quantity of dough according to the present invention that comprises a sheeting head, an infeed conveyor for conveying a quantity of dough to the sheeting head, and an outfeed conveyor for conveying a quantity of rolled and flattened dough from the sheeting head. The sheeting head defines a dough path therethrough, and includes a plurality of opposed roller pairs. A first roller of each pair is positioned on a first side of the dough path and a second roller of each pair is positioned on a second side of the dough path. The first roller of each roller pair is mounted for rotation and for independent movement toward and away from the dough path, while the second roller of each roller pair is mounted for rotation adjacent the dough path. A sensor, adjacent the infeed conveyor, senses an unduly thick or double quantity of dough being conveyed by the infeed conveyor to the sheeting head. A control is responsive to the sensor. The control causes the sheeting head to move the first roller of each roller pair away from the dough path when an unduly thick quantity of dough or a double quantity of dough is sensed, thereby preventing jamming of the sheeting head.

The sensor may comprise a photosensor and a light source positioned on opposite sides of the infeed conveyor. The first and second rollers in each roller pair may comprise direct drive rollers and, more specifically, drum motors. Each of the rollers may be coated with a coating of polytetrafluoroethylene and nickel co-deposits with a thickness of substantially between 0.0002 inches and 0.0003 inches, with a Rockwell hardness of substantially 65 to 75 on the C scale. Each of the rollers is made of a carbon steel with a finish smoothness, before depositing polytetrafluoroethylene and nickel co-deposits, of substantially 4μ-inch RMS. The coating may consist of between 12% and 25% by volume of polytetrafluoroethylene particles in a high phosphorous electroless nickel matrix.

A sheeting head defines a dough path therethrough, and includes a plurality of opposed roller pairs. Each roller comprises an independently driven drum motor having a non-rotating drum motor shaft extending from each end. A first drum motor of each pair of rollers is positioned on a first side of the dough path and a second drum motor of each pair of rollers is positioned on a second side of the dough path. The first roller of each roller pair has its drum motor shaft mounted at each end of the drum motor in support blocks. A plurality of driving servo motors are provided, with each servo motor being attached to rotate a threaded screw that is threaded through an associated support block, whereby rotation of the threaded screw causes the associated roller to move toward or away from the dough path. An infeed conveyor conveys a quantity of dough to the sheeting head. A sensor, adjacent the infeed conveyor, senses an unduly thick or double quantity of dough being conveyed by the infeed conveyor to the sheeting head. A control, responsive to the sensor, causes the driving servo motors to rotate associated threaded screws and to move their associated rollers away from the dough path, thereby opening the dough path and preventing jamming of the sheeting head. A shaft extends parallel to each roller pair for transmitting rotation of the threaded screw which moves one end of the first roller to rotate another threaded screw that is threaded through a support block at the opposite end of the first roller, thereby causing the first roller to move toward or away from the dough path.

It is an object of the present invention to provide an improved sheeting head and associated apparatus that is able to avoid jamming and that includes improved rollers.

BRIEF DESCRIPTION OF THE DRAWINGS

FIG. 3 is a side view of the sheeting head as seen from the side opposite that shown in FIG. 2A and FIG. 2B;

DETAILED DESCRIPTION OF THE PREFERRED EMBODIMENTS

Figure 1:
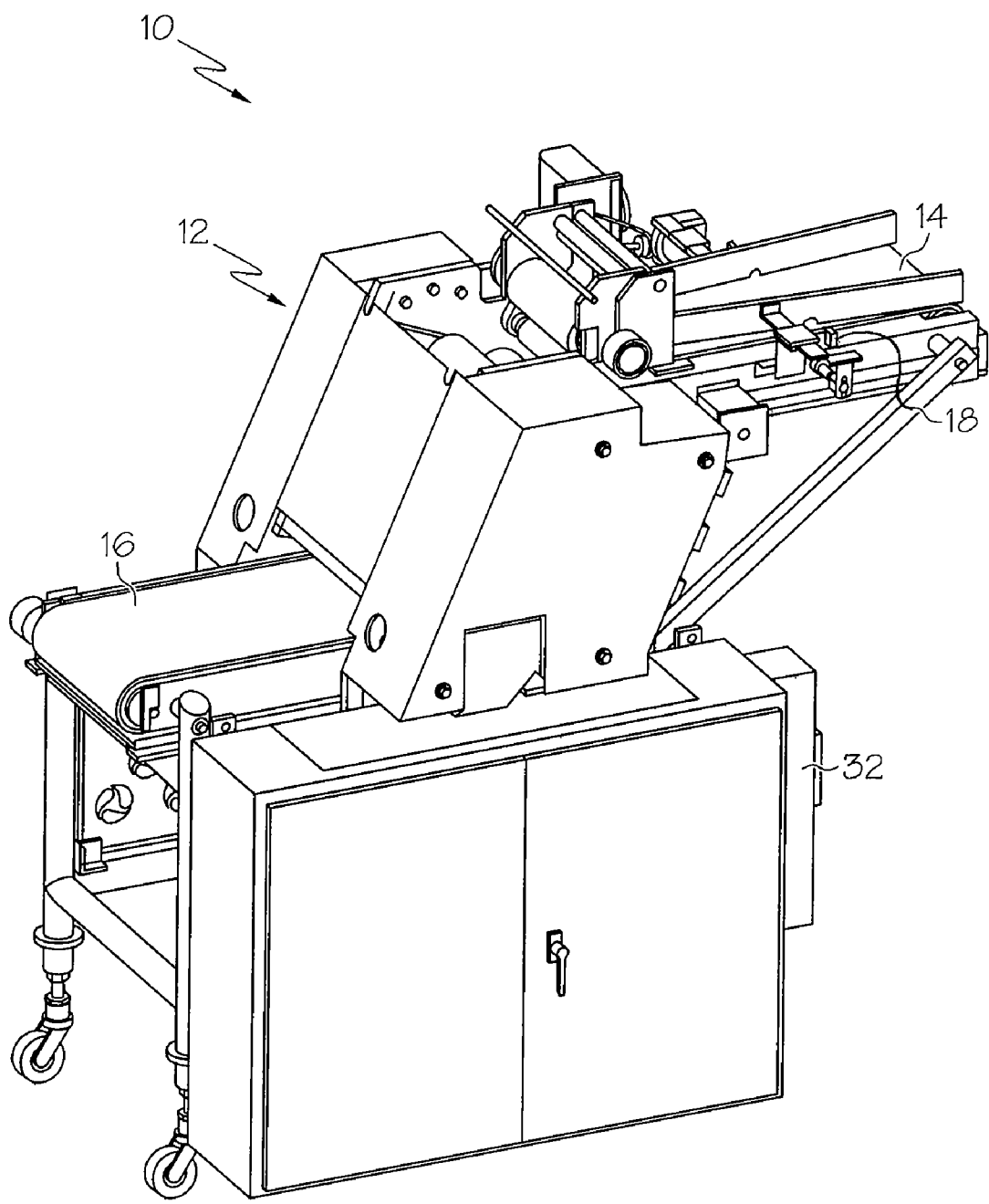
FIG. 1 is a perspective view of the sheeting head apparatus of the present invention.
Figure 4:
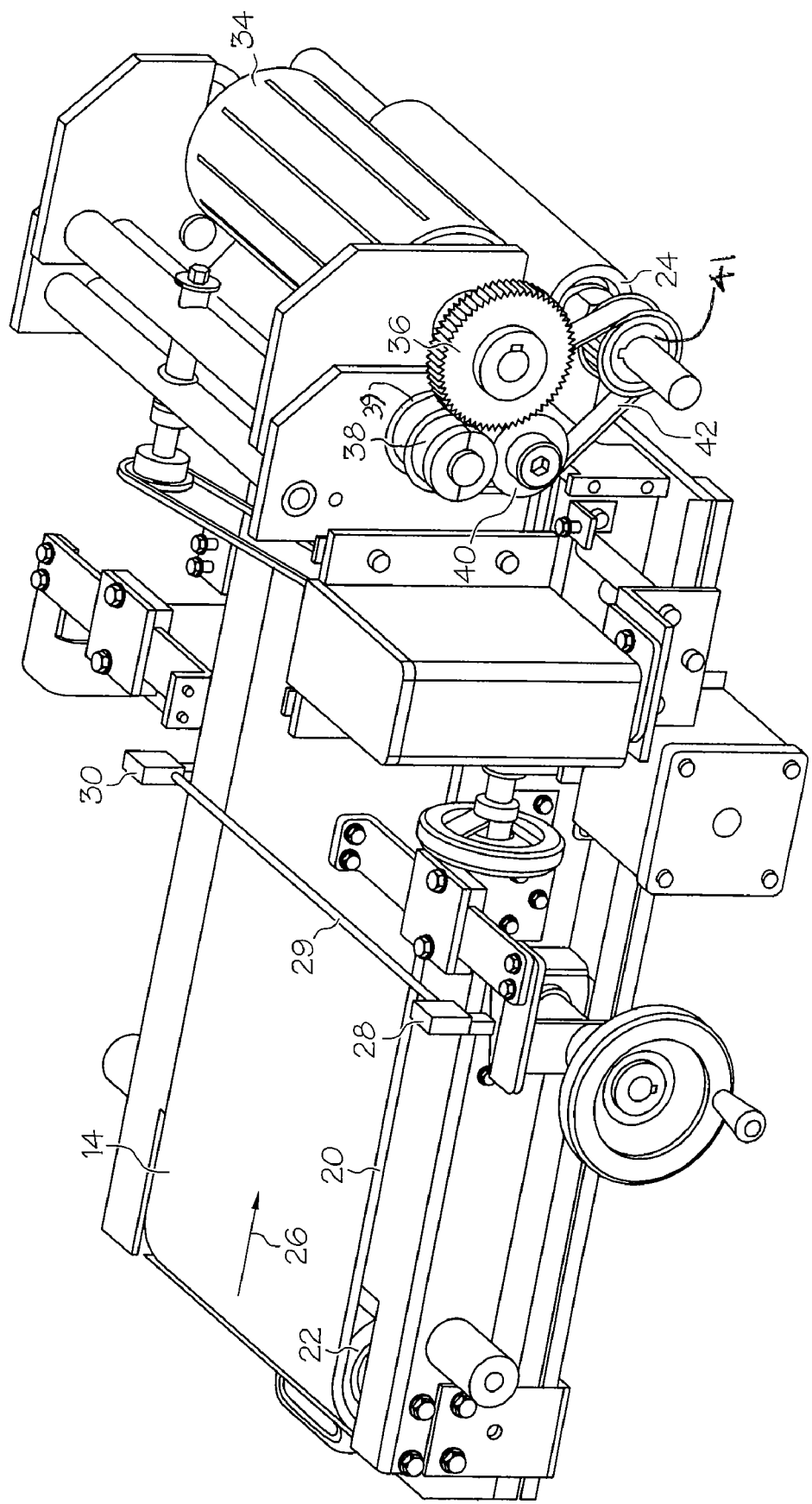
FIG. 4 is a perspective view of the infeed conveyor system for the sheeting head.

Reference is made to FIG. 1 which shows sheeting head apparatus 10 constructed according to the present invention. Apparatus 10 includes a sheeting head 12, an infeed conveyor 14 for conveying a quantity of dough to the sheeting head, an outfeed conveyor 16 for conveying a quantity of rolled and flattened dough from the sheeting head. Apparatus 10 further includes a sensor 18, described below, adjacent the infeed conveyor 14, for sensing an unduly thick or double quantity of dough being conveyed by the infeed conveyor 14 to the sheeting head 12. FIG. 4 depicts the infeed conveyor 14 which includes a belt 20 which extends around conveyor rollers 22 and 24. Pieces of bread dough of appropriate size for a loaf of bread travel along infeed conveyor 14 in the direction indicated by arrow 26.

Sensor 18 includes a light source 28 and a photosensor 30. The light source 28 directs a beam of light 29 across the path of the infeed conveyor 14 to the photosensor 30. The beam 29 is spaced above the belt 20 sufficiently that it is not interrupted during normal operation of the sheeting head apparatus. However, when a double, i.e., two pieces of dough travel along the infeed conveyor 14 or an unduly thick piece of bread is transported by the infeed conveyor 14, the beam 29 is broken for more than a preset period of time, and a control 32 alerted to this condition. The end of the infeed conveyor 14 includes a pre-gassing drum 34 which has an internal electric motor of the type which is commonly called a drum motor. The pre-gassing drum motor 34 drives gears 36 and 38. Belt 42 extends around a pulley 39 on the same shaft as gear 38, around an idler pulley 40, and around pulley 41 on the same shaft as roller 24. As a consequence, drum roller 34 drives roller 24 via a belt 42.

Figure 2A:
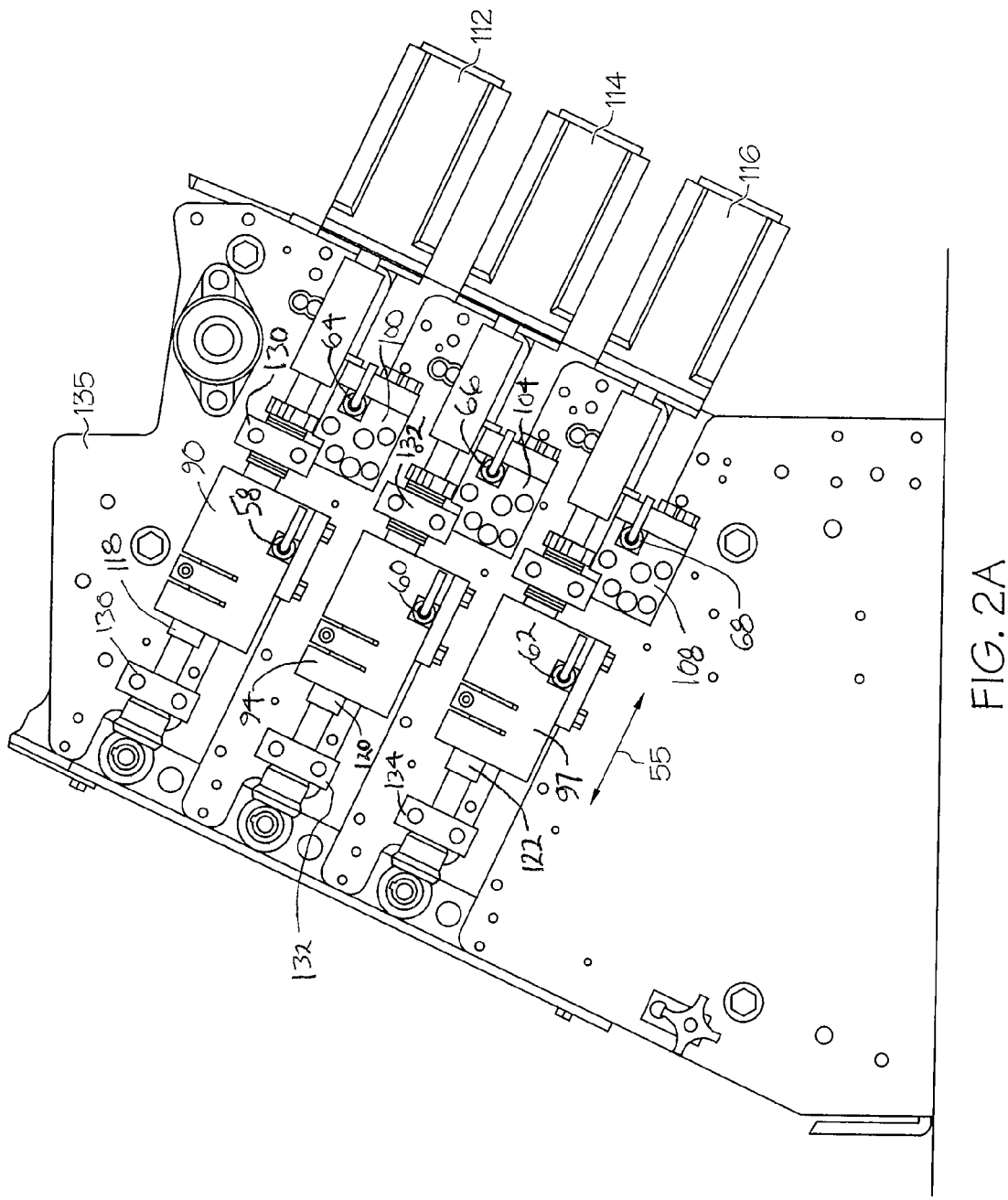
FIG. 2A is a side view of the sheeting head with the outer cabinet removed.
Figure 2B:
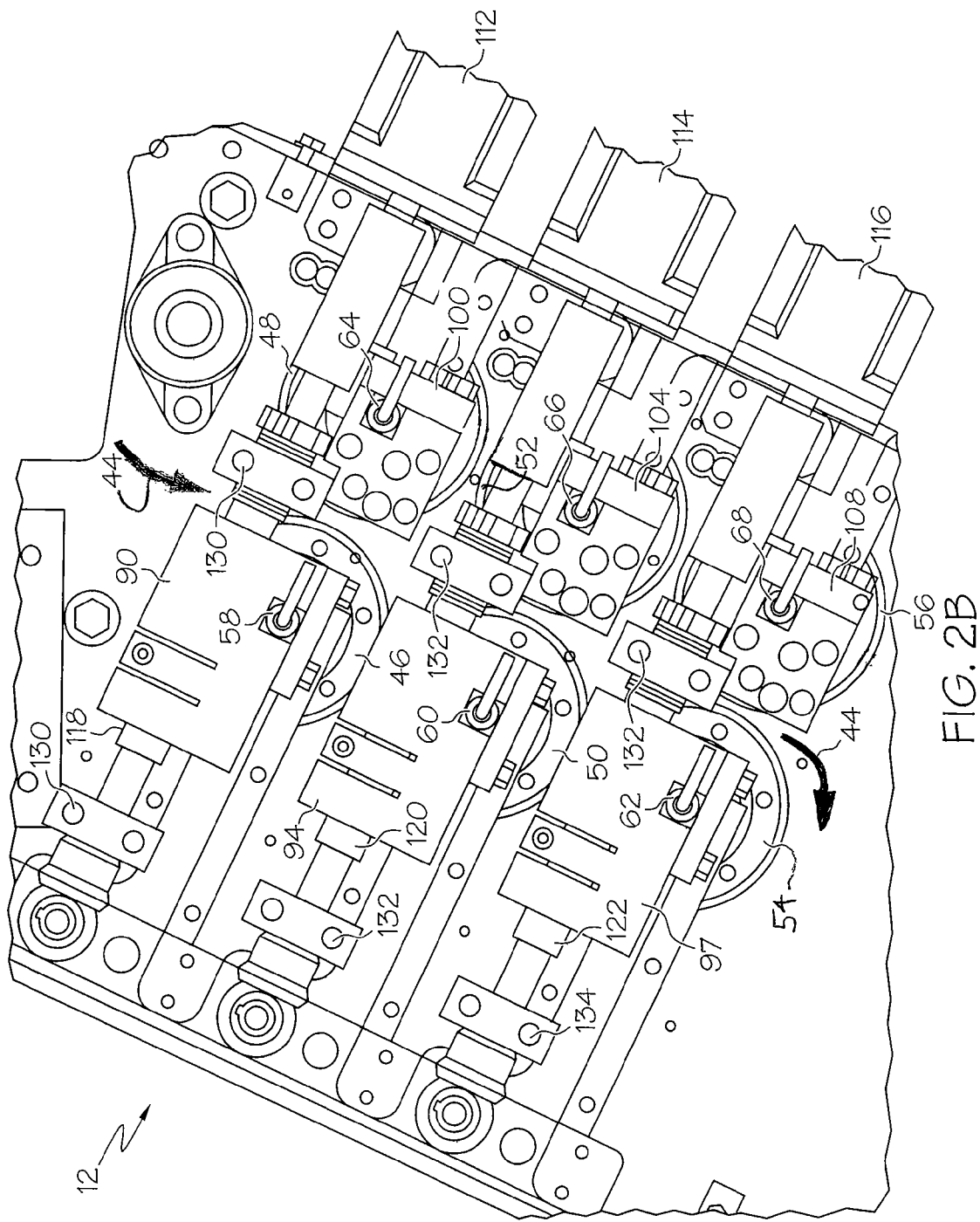
FIG. 2B is a side view of the sheeting head from the same point as FIG. 2A, but with a side support plate removed to reveal the roller pairs.

As seen in FIG. 2B, the sheeting head 12 defines a dough path, indicated by arrows 44, through the sheeting head and along which pieces of dough that enter the sheeting head 12 travel. The sheeting head 12 comprises a plurality of opposed roller pairs 46 and 48, 50 and 52, and 54 and 56. It will be appreciated that although three roller pairs are illustrated, the present invention contemplates one or more pairs of rollers. A first roller (rollers 46, 50 and 54) of each pair is positioned on a first side of the dough path and a second roller (rollers 48, 52, and 56) of each pair is positioned on a second side of the dough path. The first rollers 46, 50 and 54 of each roller pair are mounted for rotation and for independent movement toward and away from the dough path 44. The second rollers 48, 52, and 56, of each roller pair are mounted for rotation adjacent the dough path 44. The second rollers, however, do not move toward or away from the dough path 44, but instead rotates about a fixed axis.

Control 32 is responsive to the sensor 30 whenever a double quantity of dough or an unusually thick piece of dough is detected on the infeed conveyor 14 for causing the sheeting head 12 to move the first rollers 46, 50, 54 of each roller pair away from the dough path 44. This lateral movement, as indicated by arrow 55 in FIG. 2A, prevents the sheeting head from becoming jammed and possibly being damaged by an unduly thick quantity of dough or by a double quantity of dough being forced between the roller pairs along the dough path 44. The control 32 may advantageously be an appropriately programmed personal computer or a programmable logic controller (PLC).

The first and second rollers 46, 48, 50, 52, 54, and 56 in each roller pair are preferably direct drive rollers, and even more preferably are drum motors. A drum motor has an electric motor contained within a drum or roller and internally geared so that the drum shafts that support the drum motor at each end remain stationary while the roller is driven. Power is supplied to the electric motor by electrical conductors running through one of the drum shafts. Since each of the rollers 46, 48, 50, 52, 54, and 56 is separately powered, the rotational speed of the rollers can be individually controlled. Further, because the drum shafts of each of the rollers 46, 48, 50, 52, 54, and 56 remain stationary, the lateral movement of the rollers 46, 50, and 54 toward and away from the dough path 44 is facilitated. As seen in FIGS. 2A, 2B and 3, each roller or drum motor 46, 48, 50, 52, 54, and 56 has a non-rotating drum motor shaft extending from each end. More specifically, as seen in FIG. 2B, roller 46 has a non-rotating drum motor shaft 58, roller 50 has a non-rotating drum motor shaft 60, roller 54 has a non-rotating drum motor shaft 62, roller 48 has a non-rotating drum motor shaft 64, roller 52 has a non-rotating drum motor shaft 66, and roller 56 has a non-rotating drum motor shaft 68. Similarly, as seen at the opposite ends of the drum motors in FIG. 3, roller 46 has a non-rotating drum motor shaft 78, roller 50 has a non-rotating drum motor shaft 80, roller 54 has a non-rotating drum motor shaft 82, roller 48 has a non-rotating drum motor shaft 84, roller 52 has a non-rotating drum motor shaft 86, and roller 56 has a non-rotating drum motor shaft 88.

The first roller of each roller pair has its drum motor shaft mounted at each end of the drum motor in support blocks. More specifically, roller 46 has its shaft 58 mounted in support block 90 and its shaft 78 mounted in support block 92, roller 50 has its shaft 60 mounted in support block 94 and its shaft 80 mounted in support block 96, roller 54 has its shaft 62 mounted in support block 97 and its shaft 82 mounted in support block 98, roller 48 has its shaft 64 mounted in support block 100 and its shaft 84 mounted in support block 102, roller 52 has its shaft 66 mounted in support block 104 and its shaft 86 mounted in support block 106, and roller 56 has its shaft 68 mounted in support block 108 and its shaft 88 mounted in support block 110.

Figure 5:
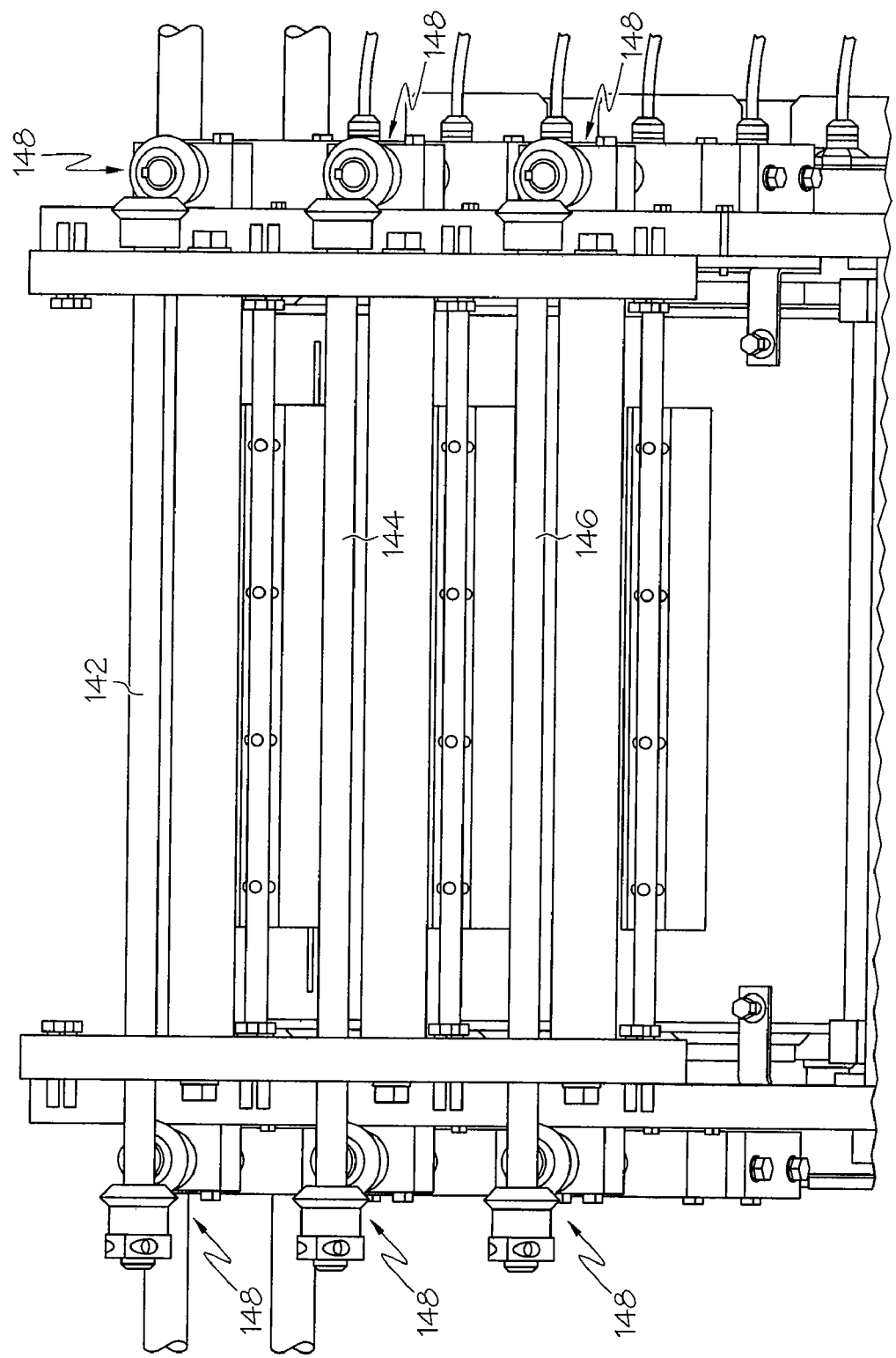
FIG. 5 is an end view of the sheeting head of the present invention.
Figure 6:
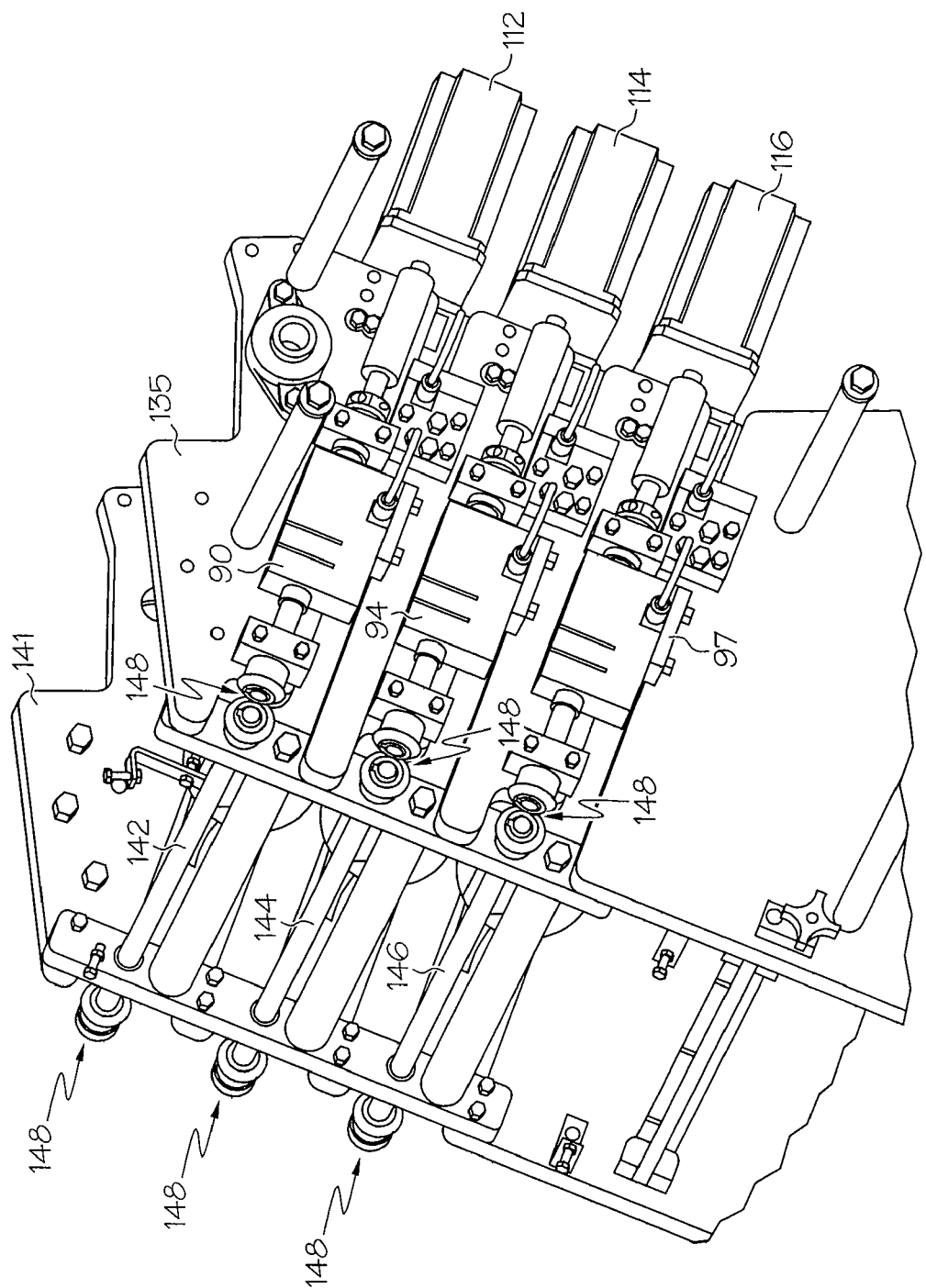
FIG. 6 is a perspective view, illustrating the manner in which both ends of some of the rollers are translated toward and away from the other rollers.

A plurality of driving servo motors 112, 114, and 116 are provided with each servo motor attached to rotate a threaded screw that is threaded through an associated support block. More specifically, servo motor 112 rotates threaded screw 118 that is threaded through associated support block 90, servo motor 114 rotates threaded screw 120 that is threaded through associated support block 94, and servo motor 116 rotates threaded screw 122 that is threaded through associated support block 97. Rotation of each of the threaded screws 118, 120, and 122 causes the ends of the associated rollers shown in FIGS. 2A and 2B to move toward or away from the dough path 44, depending on the direction of rotation. This lateral roller movement occurs simultaneously at the opposite ends of the rollers 46, 50, and 54 as support blocks 92, 96 and 98 are driven by threaded shafts 124, 126, and 128. Threaded shaft 118 is supported for rotation by bearings in bearing supports 130, threaded shaft 120 is supported for rotation by bearings in bearing supports 132, and threaded shaft 122 is supported for rotation by bearings in bearing supports 134. Bearing supports 130, 132, and 134 are mounted on side support plate 135, as are servo motors 112, 114 and 116. In similar manner, shaft 124 is supported for rotation by bearings in bearing supports 136, shaft 126 is supported for rotation by bearings in bearing supports 138, and shaft 128 is supported for rotation by bearings in bearing supports 140. Bearing supports 136, 138 and 140 are mounted on side support plate 141. Shafts 142, 144, and 146 extend parallel to rollers 46, 50 and 54 and transmit the rotation of the threaded screws 118, 120 and 122 to threaded screws 123, 126, and 128, respectively. As seen in FIGS. 5 and 6, miter gears 148 on the ends of shafts 142, 144, and 146 provide driving connections to threaded shafts 118, 120, 122, 124, 126, and 128, such that each of the servo motors 112, 114, and 116 causes both ends of the associated rollers 46, 50, and 54 to move toward and away from the dough path in synchronism.

As indicated previously, sensor 28 adjacent the infeed conveyor 14 senses an unduly thick or double quantity of dough being conveyed by the infeed conveyor to the sheeting head 12. Control 32 is responsive to the sensor 28 and provides drive signals to the driving servo motors 112, 114, and 116 to cause them to rotate associated threaded screws 118, 120, 122, 124, 126, and 128 and move associated rollers 46, 50, and 54 away from the dough path quickly, thereby opening the dough path 44 and preventing jamming of the sheeting head 12 by the sense unduly thick quantity of dough or double quantity of dough. When the unduly thick quantity of dough has passed through the sheeting head, the rollers 46, 50 and 54 are returned to their normal operating positions.

The rollers 46, 48, 50, 52, 54, and 56 are preferably coated with a coating of polytetrafluoroethylene and nickel co-deposits, the coating having a thickness of substantially between 0.0002 inches and 0.0003 inches, and with a Rockwell hardness of substantially 65 to 75 on the C scale. The coating preferably consists of between 12% and 25% by volume of polytetrafluoroethylene particles in a high phosphorous, electroless nickel matrix. Such a coating is available from Techmetals, Inc. of Dayton, Ohio under the designation TM117C. Each of the rollers is preferably made of a mild steel with a finish smoothness, before depositing polytetrafluoroethylene and nickel co-deposits, of substantially 4µ-inch RMS. It has been found that rollers constructed in this manner are corrosion resistant and have better dough release. The rollers may include a plurality of narrow shallow grooves spaced circumferentially around the roller periphery. The grooves may be on the order of 0.064 inches in width and depth, for example.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. Sheeting head apparatus for rolling and flattening a quantity of dough, comprising:
   a sheeting head defining a dough path therethrough and comprising a plurality of opposed roller pairs, a first roller of each pair being positioned on a first side of the dough path and a second roller of each pair being positioned on a second side of the dough path, the first roller of each roller pair being mounted for rotation and for independent movement toward and away from said dough path and the second roller of each roller pair being mounted for rotation adjacent the dough path,
   an infeed conveyor for conveying a quantity of dough to said sheeting head,
   an outfeed conveyor for conveying a quantity of rolled and flattened dough from said sheeting head,
   a sensor adjacent said infeed conveyor sensing an unduly thick or double quantity of dough being conveyed by said infeed conveyor to said sheeting head,
   a control, responsive to said sensor, for causing said sheeting head to move said first roller of each roller pair away from said dough path, whereby undesired jamming of said sheeting head by an unduly thick quantity of dough or by a double quantity of dough is prevented.

2. The sheeting head apparatus of claim 1 in which said sensor comprises a photosensor and a light source positioned on opposite sides of said infeed conveyor.

3. The sheeting head apparatus of claim 1 in which said first and second rollers in each roller pair comprise direct drive rollers.

4. The sheeting head apparatus of claim 3 in which said first and second rollers in each roller pair comprise drum motors.

5. The sheeting head apparatus of claim 1 in which each of said rollers is coated with a coating of polytetrafluoroethylene and nickel co-deposits with a thickness of substantially between 0.0002 inches and 0.0003 inches, with a Rockwell hardness of substantially 65 to 75 on the C scale.

6. The sheeting head apparatus of claim 5 in which each of said rollers is made of a mild steel with a finish smoothness before depositing polytetrafluoroethylene and nickel co-deposits of substantially 4µ-inch RMS.

7. Sheeting head apparatus for rolling and flattening a quantity of dough, comprising:
   a sheeting head defining a dough path therethrough and comprising a plurality of opposed roller pairs, each roller comprising an independently driven drum motor having a non-rotating drum motor shaft extending from each end, a first drum motor of each pair of rollers being positioned on a first side of the dough path and a second drum motor of each pair of rollers being positioned on a second side of the dough path, the first roller of each roller pair having its drum motor shaft mounted at each end of the drum motor in support blocks,
   plurality of driving servo motors, each servo motor attached to rotate a threaded screw that is threaded through an associated support block, whereby rotation of the threaded screw causes the associated roller to move toward or away from said dough path,
   an infeed conveyor for conveying a quantity of dough to said sheeting head,
   an outfeed conveyor for conveying a quantity of rolled and flattened dough from said sheeting head,
   a sensor adjacent said infeed conveyor sensing an unduly thick or double quantity of dough being conveyed by said infeed conveyor to said sheeting head,
   a control, responsive to said sensor, for causing said driving servo motors to rotate associated threaded screws and move their associated rollers away from the dough path, thereby opening the dough path and preventing jamming of said sheeting head by an unduly thick quantity of dough or by a double quantity of dough.

8. The sheeting head apparatus of claim 7, further comprising a shaft extending parallel to each roller for transmitting rotation of said threaded screw which moves one end of the roller to rotate another threaded screw that is threaded through a support block at the opposite end of the roller, thereby causing said roller to move toward or away from said dough path.

9. The sheeting head apparatus of claim 7 in which said sensor comprises a photosensor and a light source positioned on opposite sides of said infeed conveyor.

10. The sheeting head apparatus of claim 7 in which each of said rollers is coated with a coating of polytetrafluoroethylene and nickel co-deposits with a thickness of substantially between 0.0002 inches and 0.0003 inches, with a Rockwell hardness of substantially 65 to 75 on the C scale.

11. The sheeting head apparatus of claim 7 in which each of said rollers is made of a mild steel with a finish smoothness before depositing polytetrafluoroethylene and nickel co-deposits of substantially 4µ-inch RMS.

* * * * *